United States Patent [19]

Kawamura et al.

[11] 4,186,692
[45] Feb. 5, 1980

[54] COMPRESSION IGNITION INTERNAL COMBUSTION ENGINE WITH AUXILIARY SWIRL COMBUSTION CHAMBER

[75] Inventors: Hideo Kawamura, Yamato; Kimi Kubota, Chigasaki; Hideo Ohta, Kanagawa, all of Japan

[73] Assignee: Isuzu Motors Limited, Kawasaki, Japan

[21] Appl. No.: 901,156

[22] Filed: Apr. 28, 1978

[30] Foreign Application Priority Data

Jan. 13, 1978 [JP] Japan .................................. 53-3137

[51] Int. Cl.² .............................................. F02B 3/00
[52] U.S. Cl. ............................ 123/32 L; 123/30 D; 123/32 C
[58] Field of Search ............... 123/32 C, 32 L, 30 D, 123/32 A, 32 B

[56] References Cited

U.S. PATENT DOCUMENTS

| 1,515,168 | 11/1924 | Pokorney | 123/32 L |
|---|---|---|---|
| 1,759,161 | 5/1930 | Lang | 123/32 L |
| 2,947,292 | 8/1960 | Bottger | 123/32 B |
| 3,053,238 | 9/1962 | Meurer | 123/32 B |
| 4,006,720 | 2/1977 | Sato | 123/30 D |

FOREIGN PATENT DOCUMENTS

| 57109 | 1/1940 | Denmark | 123/32 C |
|---|---|---|---|
| 807712 | 1/1956 | United Kingdom | 123/32 B |

*Primary Examiner*—Ronald B. Cox
*Attorney, Agent, or Firm*—Sughrue, Rothwell, Mion, Zinn and Macpeak

[57] ABSTRACT

A compression ignition internal combustion engine having a swirl chamber and a primary combustion chamber both of which are fluid-connected by a primary communicating passage has a recess portion at the fuel impinged portion of the swirl chamber for producing a plurality of small swirls. A pair of second communicating passages connecting the swirl chamber and the primary combustion chamber are so designed as to be directed to the center of the swirl chamber whereby the separation of fuel and air is prevented and the harmful components within the exhaust gas are effectively reduced without deteriorating the combustibility of the mixture.

3 Claims, 3 Drawing Figures

COMPRESSION IGNITION INTERNAL COMBUSTION ENGINE WITH AUXILIARY SWIRL COMBUSTION CHAMBER

BACKGROUND OF THE INVENTION

The present invention relates to a compression ignition internal combustion engine having an auxiliary swirl combustion chamber enabling to reduce noxious components contained in exhaust gas, such as CO, NOx and incombustible hydrocarbon.

In a conventional swirl chamber of a compression ignition chamber, fuel injected from an injection nozzle is mixed with air by forming a strong swirl of air introduced from a primary combustion chamber through a primary communicating passage during the compression stroke of the rising piston. However, the swirling motion causes the so-called thermal pinch phenomenon in which incombustible hydrocarbon and high temperature combustible gas are concentrated on the outer portion and the central portion, respectively, by the centrifugal force of the swirl motion, resulting in the separation therebetween. This results in improper combustion and a consequent increase in harmful components in the exhaust gases.

On the other hand, the diameter of the substantial combustion zone in the swirl chamber is somewhat greater than that of the primary communicating passage between the swirl chamber and the primary combustion chamber. Thus, a vortical combustion is generated in the swirl chamber. The air surrounding the combustion zone, i.e., so called solid rotation zone, is continuously provided to the flame in the central portion of the combustion zone to thereby produce suitable turbulence and to positively introduce fresh air into the combustion zone. As a result, the mixing the fuel and the air is promoted. This is well known to one skilled in the art.

SUMMARY OF THE INVENTION

In view of the above, it is an object of the present invention to produce an improved compression ignition internal combustion engine having a swirl chamber. The mixing in the central portion of the swirl chamber is promoted by introducing air from the primary combustion chamber making use of the pressure difference generated in the swirl chamber by the swirling motion, and local combustion is prevented. At the same time a recess portion is provided in the wall of the swirl chamber on which the fuel mist from the fuel injection nozzle impinges. The fuel-impinged wall is on the downstream side of the swirl chamber, and the turbulene of the air is generated without weakening the motion of air flow. Accordingly, the harmful components in the exhaust gases such as CO and hydrocarbon can be decreased.

DETAILED DESCRIPTION OF THE INVENTION

Figure 1:
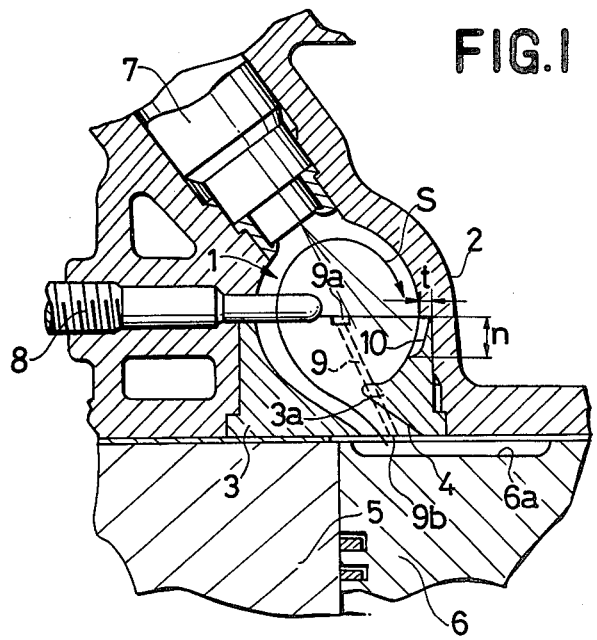
FIG. 1 shows a cross sectional view of the embodiment of the swirl chamber according to the present invention.

Referring to the drawings, reference numeral 1 designates an auxiliary swirl chamber an upper chamber portion of which is constructed in a cylinder head 2 and a lower chamber portion of which is formed in a member 3 in a compression ignition internal combustion engine. The auxiliary swirl chamber is in the form of a substantial sphere. Numeral 4 designates a primary communicating passage which fluid-connects the swirl chamber 1 and a primary combustion chamber 6a defined by a slidable piston 6 in a cylinder block 5. The communicating passage 4 is so designed that the passage 4 is directed in a direction tangential to an inner wall of the swirl chamber 1 for the purpose of generating a strong swirl during the compression stroke of the piston 6, and a fuel injection nozzle 7 injects the fuel into the air flow S. Numeral 8 designates a glow plug which is projected through the side of cylinder head into the swirl chamber immediately above the swirl chamber forming member 3 for assistance in engine starting.

Reference numeral 9 designates a pair of second communicating passages from the primary combustion chamber to the swirl chamber. The second communicating passages 9 are formed in the side walls of the swirl chamber so as to direct air into the swirl chamber in a direction substantially normal to the swirl flow S. Upper ends 9a of the passages 9 formed in the side walls of the swirl chamber are substantially oppositely positioned on the line 0—0 passing through the center of the swirl chamber and are directed to the central portion of the swirl chamber while lower ends 9b of the passages 9 are in fluid-communication with the primary combustion chamber.

Figure 2:
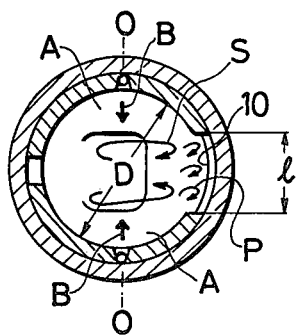
FIG. 2 shows a top view of the swirl chamber forming member in FIG. 1.

Numeral 10 designates a recess portion in the wall of the swirl combustion chamber forming member 3 on which the injected fuel from the injection nozzle 7 impinges. In order to aid the turbulence of the air existing in portions which are under a comparatively small influence of the swirl flow S and shown as areas A in FIG. 2, resulting in the poor combustion, the width l of the recess portion 10 is desired to be 40 to 80% of the diameter D of the swirl chamber. Further, in order to prevent the swirl flow generated in the swirl chamber from being weakened and in order to form a plurality of small swirls P therein, the depth t of the recess portion 10 is desired to be 3 to 10% of the diameter D of the swirl chamber. The longitudinal length n of the recess portion 10 should be short enough so that the recess does not reach a horizontal impinging shelf 3a of the forming member 3.

With such an engine construction as described above, the pressure difference or pressure gradient is generated in the swirl chamber along with the centrifugal force, and a fresh air B is introduced from the primary combustion chamber 6a through the second communicating passages 9 into the swirl chamber. Thus, the dispersion and combustion of the fuel mist are promoted to thereby reduce CO and hydrocarbon, and the fresh air 8 cools the central portion of the swirl chamber to thereby reduce NOx.

Figure 3:
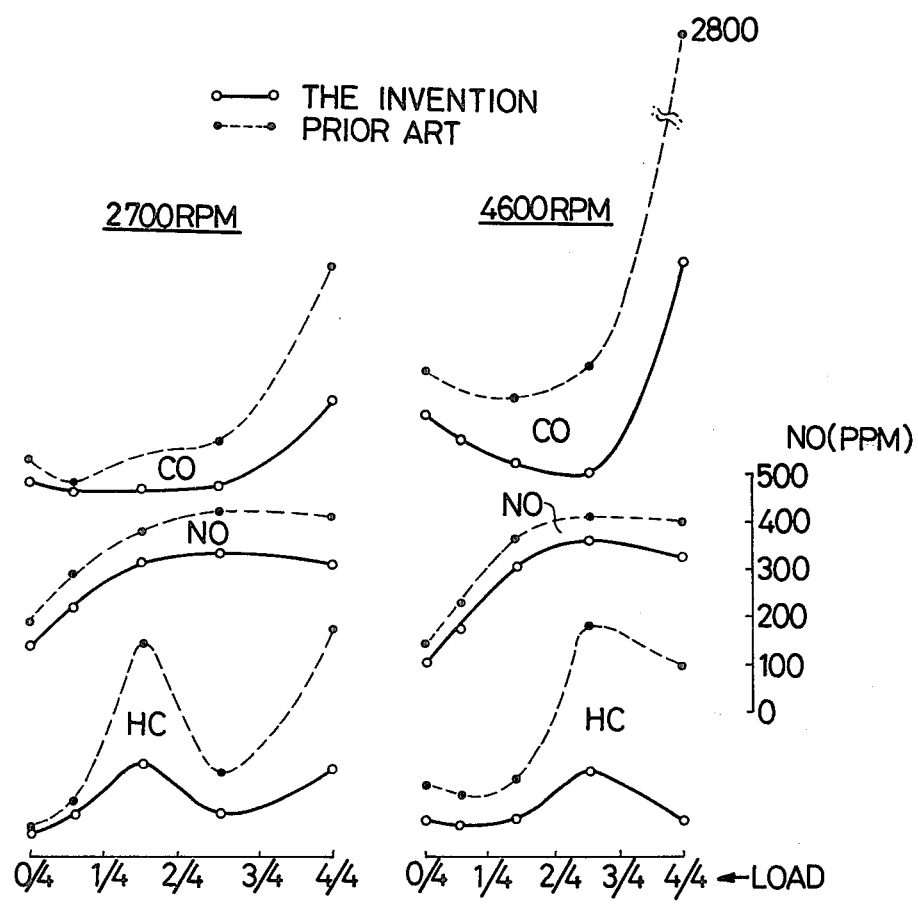
FIG. 3 includes several graphs showing the relation between the engine load and the harmful components contained in the exhaust gas according to the present invention.

Since the peripheral mixture is introduced into the central combustion zone of the swirl S by the small swirls P without weakening the primary swirl flow, the combustibility is greatly enhanced. As shown in FIG. 3, carbon monoxide CO is reduced by 20 to 60%, hydrocarbon HC by 40 to 60% and oxidized nitrogen NO by about 20%. FIG. 3 shows data at engine rotational rates of 2700 and 4500 rpm.

An additional advantage is that the present invention is easily adaptable to a conventional engine since the communicating passages and the recess portion are manufactured in an otherwise conventional swirl chamber forming member.

What is claimed is:

1. A compression ignition internal combustion engine having a piston, associated cylinder, a cylinder head and a fuel injection nozzle, comprising:
    (a) a primary combustion chamber defined by the piston, associated cylinder and cylinder head,
    (b) an auxiliary swirl combustion chamber having a wall on which fuel from said injection nozzle impinges, an upper half of said auxiliary swirl combustion chamber being formed in the cylinder head and a lower half of said auxiliary swirl combustion chamber being formed by a swirl chamber forming member, said swirl chamber being substantially in the form of a sphere,
    (c) a primary communicating passage connecting the primary combustion chamber and the auxiliary swirl chamber for indroducing compressed air from the primary combustion chamber to the auxiliary swirl chamber during the compression stroke of the piston and thereby forming a main swirl along the inner periphery of the swirl chamber,
    (d) a pair of second communicating passages connecting the primary combustion chamber and the auxiliary swirl chamber for supplementally introducing compressed air from the primary combustion chamber to the auxiliary swirl chamber during the piston compression stroke, said passages being directed to the central portion of the swirl chamber and being formed in the side walls of the swirl chamber so as to introduce air in a direction substantially normal to the main swirl flow from opposite sides of the swirl chamber for introducing air under a small influence of the swirl flow into the central portion of the swirl chamber, and
    (e) a recess portion being provided in the wall onto which the fuel is injected to thereby produce a plurality of small swirls.

2. A compression ignition internal combustion engine as defined in claim 1, wherein said recess has a width of 40 to 80% of the diameter of the swirl chamber and a depth of 3 to 10% of the diameter of the swirl chamber.

3. A compression ignition internal combustion engine as defined in either of claims 1 or 2, wherein the lower half of said swirl chamber is provided with a horizontal impinging shelf and a longitudinal length n of the recess in the direction of the main swirl flow is smaller than the distance from the upper end of said swirl chamber forming member to said shelf.

* * * * *